United States Patent [19]

Samson

[11] 3,952,197

[45] Apr. 20, 1976

[54] ION CHAMBERS

[76] Inventor: James A. R. Samson, 1600 Regency Drive, Lincoln, Nebr. 68520

[22] Filed: Feb. 14, 1975

[21] Appl. No.: 550,114

[52] U.S. Cl. .................................. 250/382; 250/372; 250/389

[51] Int. Cl.² .......................................... G01T 1/18

[58] Field of Search ........... 250/372, 374, 382, 384, 250/389, 393, 395

[56] References Cited

UNITED STATES PATENTS 3,394,280 7/1968 Trumble ......................... 250/372 X

*Primary Examiner*—Davis L. Willis
*Attorney, Agent, or Firm*—Larson, Taylor & Hinds

[57] ABSTRACT

Ion chambers adapted for use with radiant energy in the vacuum ultraviolet and X-ray spectral regions are provided wherein the ion repeller and collector electrodes are configured to provide an electric field therebetween which has a non-uniform potential gradient allowing a photon beam to be passed through a region of low field strength. A further aspect of the configuration of the ion repeller and collector electrodes is the elimination of the need for guard rings.

11 Claims, 3 Drawing Figures

ION CHAMBERS

FIELD OF THE INVENTION

This invention relates generally to devices for detecting ionization of a gas by a source of radiant energy, and, more particularly, to such devices for use for measuring the absolute intensity of radiant energy by means of ionization of a gas, where the wavelength of the radiant energy is in the vacuum ultraviolet and X-ray spectral regions.

BACKGROUND OF THE INVENTION

There are many fields in which the absolute intensity of vacuum ultraviolet radiation must be measured. For example, in basic atomic and solid state physics research, the determination of the ability of radiation to ionize gases, and the measurement of absolute photoelectric emission yields of materials requires measurement of vacuum ultraviolet radiation. Of particular research importance is the determination of absolute absorption and photoionization cross-sections of various gases.

Prior to the development of parallel plate, high field strength ion chambers, measurement of radiant energy in the vacuum ultraviolet spectral region was difficult and generally unsatisfactory. Thus, although thermocouples which have been calibrated against a standard lamp traceable to the National Bureau of Standards are normally used to measure radiant energy in the visible and infrared spectral regions, and, although such thermocouples have been used to measure radiant energy in the vacuum ultraviolet spectral region, they are extremely insensitive and difficult to use at these wavelengths. Moreover, such thermocouples must be calibrated with visible light and an assumption made that the calibration remains valid for use of the thermocouples with vacuum ultraviolet radiation. As a consequence, measurements with thermocouples in the vacuum ultraviolet region have been either unobtainable, or inaccurate and unreliable.

In the X-ray spectral region, absolute radiation measurements have been made through the use of geiger counters and proportional counters. However, these devices cannot be used for absolute measurements in the vacuum ultraviolet region between 100 and 1020 A.

For wavelengths between 1020 A and 1400 A, ion chambers of various designs using "windows" of lithium or magnesium fluoride have been used as detectors but this type of ion chamber must be calibrated against a thermocouple.

With the development of parallel plate, high field strength ion chambers, measurements of the absolute intensity of vacuum ultraviolet radiation became possible without having to rely on other standards for calibration. Various embodiments of such ion chambers are described in Samson, "Absolute Intensity Measurements in the Vacuum Ultraviolet," 54 J. Opt. Soc. Am. 6 (January 1964) which is hereby incorporated by reference. When such devices are used as "double" ion chambers, their accuracy is extremely high, since fluctuations in the intensity of the radiation source do not affect the measurements. In addition, such double ion chambers provide the most precise method of measuring absolute absorption cross-sections in the spectral regions where the particle energies are greater than the ionization threshold of the gas being measured. When parallel plate ion chambers are being used as simple detectors, they have the further advantage of being wavelength selective. However, there are several features of the prior art parallel plate ion chambers which limit their usefulness and accuracy.

Whether a "single" ion chamber utilizing a single ion-collector electrode, or a "double" ion chamber utilizing a pair of ion-collector electrodes, parallel plate ion chambers are characterized by plate-like ion repeller and collector electrodes in substantially parallel arrangement with respect to each other. Assuming a substantially uniform charge distribution on the respective electrodes, the electrical field formed between the repeller and collector electrodes is characterized by a linearly increasing voltage potential, i.e., a uniform or constant potential gradient. Since high potential differences between repeller and collector electrodes are necessary to provide sufficient retarding voltages to prevent the collection by the ion collector electrodes of the relatively high energy electrons formed when gases are ionized by vacuum ultraviolet radiation, it is not possible to locate the photon beam from the radiation source between the repeller and collector electrodes so that the electrons generated by ionization of the gas do not acquire significant amounts of energy in travelling to the ion repeller electrode. As a consequence, the short-wavelength limit of parallel plate, high field strength double ion chambers; i.e., the wavelength at which secondary electron ionization of the gas occurs, is approximately 330 A. This figure is well above the possible limit, which is 250 A, thus limiting the usefulness of such devices.

It is an object of the present invention, in accordance with one aspect thereof, to provide ion chambers capable of measuring vacuum ultraviolet radiation which approaches 250 A in wavelength, which chambers may be of either single or double collector electrode configuration.

Prior art double ion chambers are further characterized by the inclusion of at least one guard ring electrode, and usually multiple guard ring electrodes, to ensure that each ion collector electrode will only collect ions formed vertically above it. In addition to increasing the complexity of ion chamber design and construction, the use of guard rings limits the minimum path length which can be provided for the ionizing photon beam to travel between the repeller and collector electrodes. This fact limits the utility of double ion chambers where the gas to be ionized is strongly photon absorbing. Further, since the presence of guard rings necessarily increases the length of the double ion chamber, the region in which the electrons produced by the ionization process can cause secondary ionization is also increased. Another disadvantage of guard rings is the fact that the collector electrodes must have minimum width and length dimensions in relation to the dimensions of the guard rings in order for the guard rings to be effective. As a consequence, the reliability of such ion chambers is reduced, since the greater the surface area of the collector electrodes, the greater the probability is that scattered photons from the photon beam will strike the collector electrodes and thereby generate erroneous ion current measurements. It is a further object of this invention, in keeping with another aspect thereof, to provide improved ion chambers which do away with such guard rings, and which in the case of double ion chambers, are of symmetrical design both in general construction and in electric field.

SUMMARY OF THE INVENTION

These and other disadvantages of the prior art are overcome by the ion chambers of the present invention, a preferred construction of which comprises a pressure chamber, means for at least partially evacuating the pressure chamber, means for introducing the gas to be ionized into the chamber, means for introducing the radiant energy photon beam into the chamber, an ion-repeller electrode disposed within the chamber, at least one ion-collector electrode disposed within the chamber in spaced relation to the ion-repeller electrode, means for positively charging the ion-repeller electrode with respect to the ion-collector electrode(s) to create an electric field therebetween, and means for detecting the ions collected by the ion-collector electrode(s), the ion-repeller and ion-collector electrodes being so shaped and arranged with respect to each other that the electric field therebetween has a non-uniform potential gradient, allowing the gas to be ionized by the radiant energy in a region of comparatively low field strength, and the electrons thereby formed to be collected by the ion-repeller electrode with at most a small gain in energy to minimize secondary ionization of the gas by the electrons, while allowing the electrons to be repelled from the ion-collector electrode(s) by a sufficiently high electron retarding potential energy to minimize the collection of the electrons by the ion-collector electrode(s).

In keeping with another aspect of the invention, the ion repeller electrode is symmetrical about its transverse mid-plane, and two ion-collector electrodes are provided disposed within the pressure chamber in spaced relation to the ion-repeller electrode such that the ion-collector electrodes are substantially symmetrically disposed with respect to the transverse mid-plane of the ion-repeller electrode. The electric field created between the ion-repeller and ion-collector electrodes is thus substantially symmetrical about the transverse mid-plane of the ion repeller electrode. Such an embodiment of the invention may be further provided with end plates for defining the ends of the symmetric electric field electrically connected to the ion repeller electrode and disposed respectively at each end thereof such that the end plates are substantially parallel with respect to each other and symmetrically disposed with respect to the transverse mid-plane of the ion-repeller electrode. Preferably, although not essentially, the end plates are of substantially identical construction. Guard rings are thus unnecessary.

In keeping with the invention, the first-mentioned features may be incorporated in the second described ion chamber, and vice versa.

The features of the ion chamber described herein allow the ion chamber to be operated as a double ion chamber at shorter wavelengths and with greater accuracy than heretofore possible.

In addition, when the ion chambers of the present invention are operated as single ion chambers by electrically connecting the ion collector electrodes together externally of the pressure chamber, the features described herein allow the short-wavelength limit of the ion chamber to be extended into the x-ray region to at least 40 A when the low pressure extrapolation techniques described in Samson and Haddad, "Absolute Photon-flux Measurements in the Vacuum Ultraviolet," 64 J. Opt. Soc. Am. 47 (January 1974) (which was distributed no earlier than Feb. 14, 1974), are used. The article and its contents are also hereby incorporated by reference.

Other features and advantages of the invention will be set forth in, or apparent from, the detailed description of preferred embodiments found hereinbelow.

DETAILED DESCRIPTION OF PREFERRED EMBODIMENTS

Figure 1:
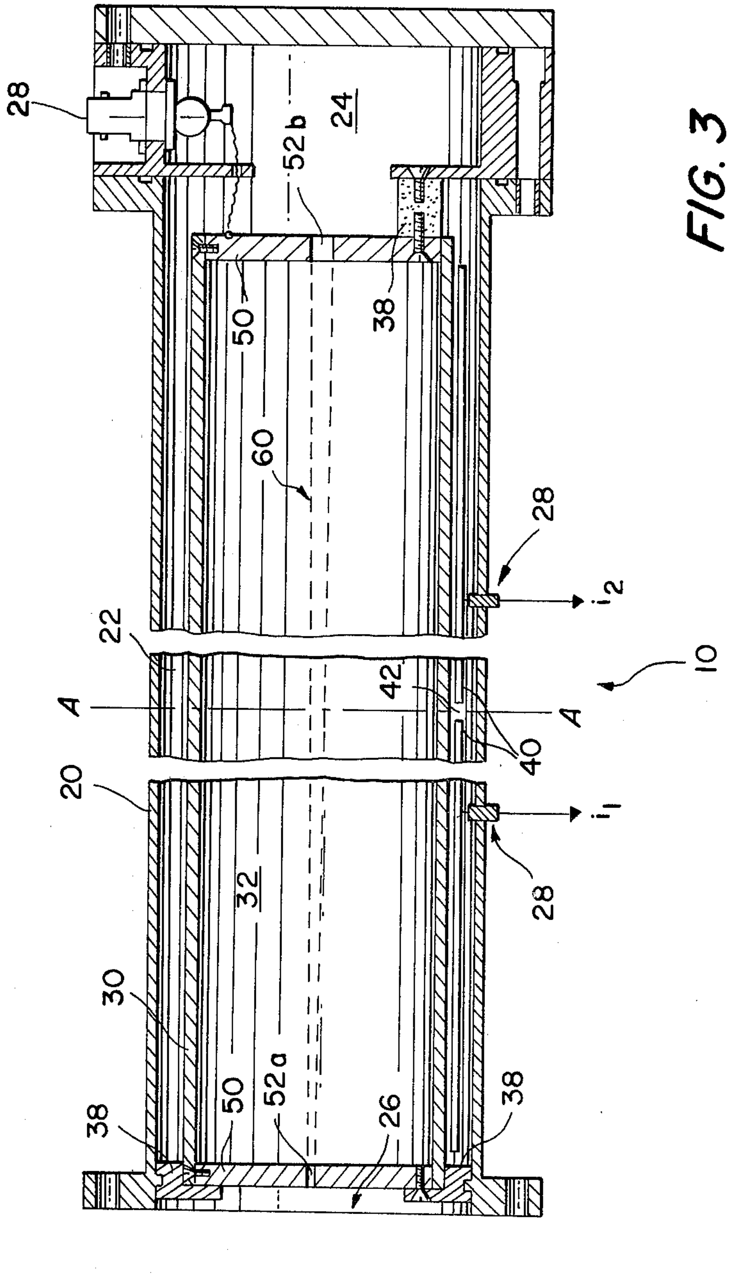
FIG. 1 is a side elevation, partially in section, of an ion chamber embodying the invention, with portions omitted for purposes of clarity.

Referring to FIG. 1, the ion chamber of the present invention, generally denoted 10, comprises pressure chamber 20, which is capable of being evacuated to a substantial vacuum, conventional pumping means (not shown) for evacuating pressure chamber 20, conventional means (not shown) for introducing the gas to be ionized into pressure chamber 20, ion repeller electrode 30 disposed within pressure chamber 20, ion collector electrodes 40 disposed within pressure chamber 20 in spaced relationship to ion-repeller electrode 30 as will be described more fully hereinbelow, end plates 50 located at each end of ion-repeller electrode 30 and electrically connected thereto, conventional means (not shown) for providing an electrical potential difference between ion repeller electrode 30 and ion-collector electrodes 40, and conventional current-measuring means (not shown) for measuring the number of ions collected by ion-collector electrodes 40.

Pressure chamber 20 is of conventional design, comprising a main chamber 22 housing the ion repeller and collector electrodes 30 and 40 and an after chamber 24 for housing electrical connections. After chamber 24 allows secondary radiation detectors (not shown) to be attached to pressure chamber 20 when ion chamber 10 is being used as a single or double ion chamber, when secondary detectors are being calibrated, or for conducting other experiments. One end of pressure chamber 20, denoted 26, is adapted for connection with conventional monochromators (not shown).

The means provided for introducing the gas to be ionized to the pressure chamber 20 must be designed so as to ensure that the gas is at a uniform pressure at least in the region occupied by electrodes 30 and 40, as is conventional. Since there are no transparent materials in the vacuum ultraviolet spectral region, when the ion chamber is used with a monochromator the monochromator vacuum system must be maintained at a high vacuum to ensure that the photon density at the monochromator exit slit is the same before and after the gas to be ionized is introduced into pressure chamber 20. Although a flow of gas will be created in pressure chamber 20 as the gas exits ion chamber 10 through the monochromator exit slit, there are no appreciable pressures gradients resulting from this flow because of the narrow exit dimensions involved, e.g. approximately 50 microns wide by 1 centimeter in length.

The source of electrical potential and the ion current measuring means are electrically connected to the electrodes 30 and 40 through pressure chamber 20 by conventional sealed conduits, denoted 28. Ion repeller electrode 30 is positively charged with respect to ion-collector electrodes 40. The positive potential applied to electrode 30 must be at least equal to the energy of the electrons ejected during ionization of the gas within pressure chamber 20. With a source of radiation having a wavelength of 250 A, and helium as the gas to be ionized, the electrons ejected during ionization may have an energy of 24.6 electron volts. Under these conditions, a positive potential of 25 volts would be sufficient, and 30 volts is suitable.

Figure 2:
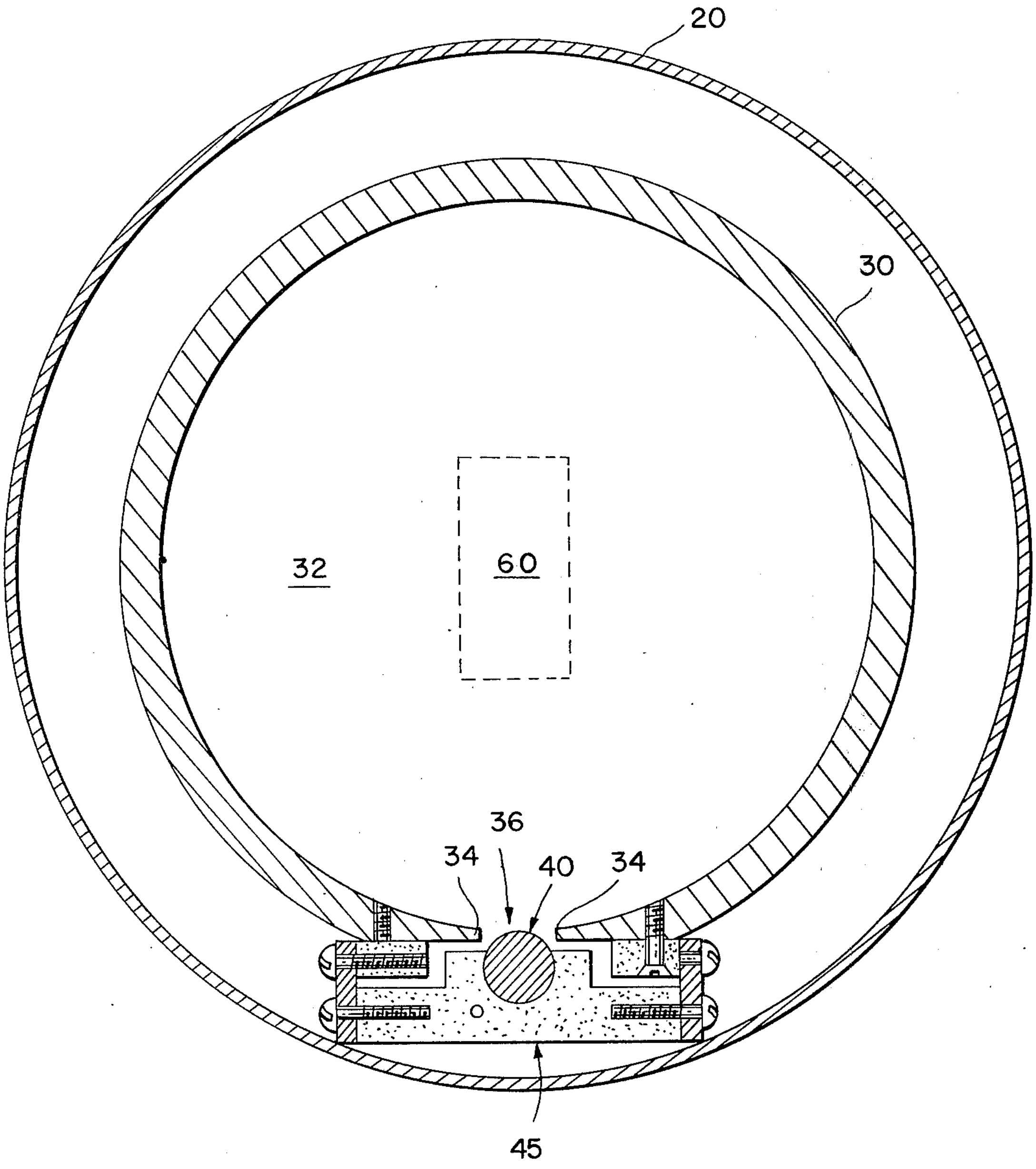
FIG. 2 is a transverse cross-section of the ion chamber of FIG. 1, drawn to a larger scale, and with portions omitted for purposes of clarity.

Referring to FIG. 2, ion repeller electrode 30 comprises an elongated surface either bent or curved to define a substantially enclosed space 32 with a rectilinear or curvilinear cross-section. The edges 34 of electrode 30 are in spaced, substantially opposed relationship and define an elongated, relatively narrow slot 36. The cross-section of enclosed space 32 may advantageously be cylindrical, as illustrated, rectangular, or any other shape which provides an electric field in cooperation with ion collector rods 40 that has a configuration of the type described hereinbelow. Ion repeller electrode 30 is insulatingly supported within pressure chamber 20 by means of insulated support means, denoted 38 (FIG. 1). In accordance with another important feature of the invention, electrode 30 is symmetrical about its transverse mid-plane, which is indicated at A—A in FIG. 1.

Each ion collector electrode 40 comprises an elongated rod of small cross-sectional area and is disposed parallel to the longitudinal axis of ion-repeller electrode 30 in spaced relationship to slot 36 such that the outer surface of electrode 40 is substantially tangentially coplanar with slot 36.

The diameter of electrodes 40 and their position with respect to slot 36 are chosen so as to minimize the surface area of electrodes 40 exposed to enclosed space 32, and thus minimize the possibility of any scattered radiation striking the ion-collector electrodes 40 and generating error-producing currents in the current-measuring device. Thus the preferred arrangement of ion electrodes 40 is as shown in FIGS. 1 and 2, wherein electrodes 40 are disposed partially within and generally below the plane of slot 36, and the diameter of electrodes 40 is comparable with the width of the slot 36.

Ion collector electrodes 40 are of equal lengths, are disposed in spaced, colinear relationship with respect to each other, as shown in FIG. 1, and, in accordance with an important feature of the invention, electrodes 40 must be disposed symmetrically with respect to the transverse mid-plane A—A to create an electric field which is symmetrical about the transverse mid-plane A—A.

In lieu of symmetry about mid-plane A—A, a highly transparent perpendicularly oriented mesh (not shown) at the same electrical potential as ion-repeller electrode 30 may be installed so as to divide enclosed space 32 into two regions at the point where ion collector electrodes 40 are spaced. However, in such an arrangement, the photon transmission characteristics of the mesh must be accurately known.

The spacing between the electrodes 40, denoted 42, must be small in relation to the length of electrodes 40. For example, a ratio of one percent for the spacing 42 compared to the length of electrodes 40 is suitable.

Electrodes 40 are supported in spaced relationship from slot 36 of electrode 30 by means of an insulated support strip 45 mounted on electrode 30 as shown in FIG. 2, strip 45 being omitted in FIG. 1 for purposes of clarity.

Substantially identical end plates 50 are mounted on ion-repeller electrode 30 at each end thereof, as shown in FIG. 1, to define the ends of the electrical field between electrodes 30 and 40. Plates 50 are provided with holes **52*a* and 52*b* in coaxial alignment to allow the photon beam 60 from a radiation source (not shown) to pass through the enclosed space 32 defined by electrode 30. Hole 52*b* in the plate 50 further from the radiation source may have a slightly larger diameter than hole 52*a* in the plate 50 nearer to the radiation source to allow for dispersion of the photon beam as it passes through the gas to be ionized. Holes 52*a* and 52*b* may advantageously be aligned with the longitudinal axis of electrode 30, or may be displaced vertically from the longitudinal axis away from the ion collector electrodes 40 so that the photon beam 60 passes as closely as possible to that portion of the interior surface of electrode 30 which is relatively opposed to slot 36 without coming into contact therewith. The further the axis of travel of the photon beam is from the ion collector electrodes 40, the less opportunity there is for scattered radiation from the photon beam to be collected by the collector electrodes 40** and thus cause errors in the measurement of the ion currents.

Plates 50 may be comprised either or both of a solid conductive material, or a relatively transparent conductive mesh. Preferably they are of identical construction, but this is not essential so long as any structural differences are not such as to materially affect the field symmetry.

Figure 3:
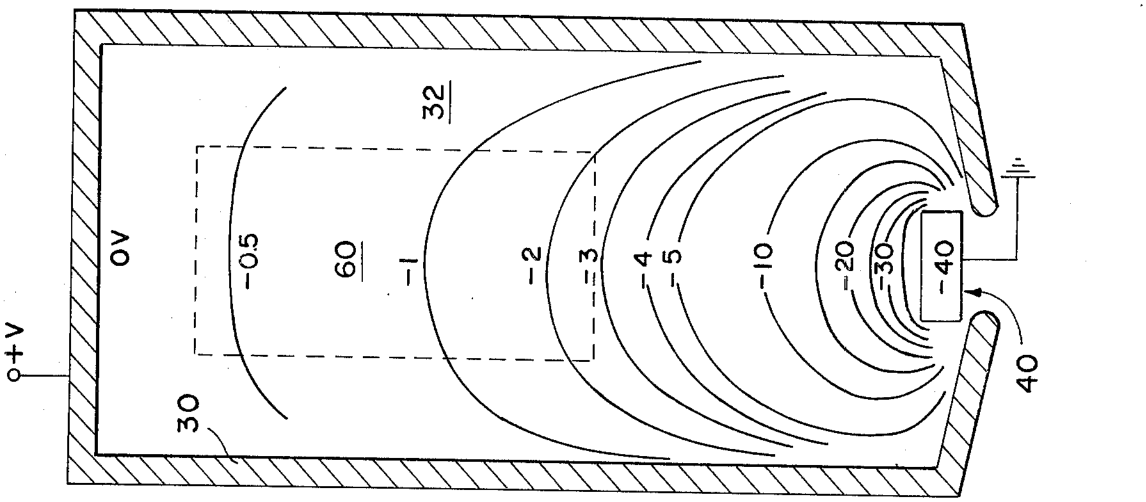
FIG. 3 is a diagrammatic transverse cross-section of the ion repeller and collector electrodes of an ion chamber embodying the invention, illustrating the potential gradient of the electric field formed therebetween.

As a result of the configuration and arrangement of ion-repeller electrode 30 and ion-collector electrodes 40 with respect to each other, the electric field resulting when electrode 30 is positively charged with respect to electrodes 40 has a non-uniform potential gradient between the electrode 30 and electrode 40, as shown in FIG. 3 for an electrode 30 of rectangular cross-section. As a consequence, the photon beam 60 may be caused to pass through a region of much lower field strength than is possible with the conventional parallel plate construction of ion chamber 10. The electrons formed as a result of the ionization of the gas by the photon beam thus acquire a minimal amount of additional energy as they travel to ion-repeller electrode 30, and hence secondary ionization by the electrons is minimized. At the same time, the electric field configuration provides a sufficiently high retarding potential to prevent these electrons from being collected by the ion collector electrodes 40.

As a result of the symmetrical construction and arrangement of electrodes 30 and 40 and end plates 50 with respect to each other, the electric field created between electrodes 30 and 40 is symmetrical about the transverse mid-plane of electrode 30, thus allowing the conventional guard rings associated with double ion-collector electrode ion chambers to be dispensed with, while ensuring that the ion collector electrodes 40 only collect ions formed over regions having substantially equal lengths.

It will be appreciated by those skilled in the art that although the invention has been described relative to exemplary embodiments thereof, modifications and variations can be effected in these embodiments without departing from the scope and spirit of the invention.

In particular, it is to be noted that the features described herein above enabling ion chamber 10 to be constructed without guard rings are equally adaptable to parallel plate high field strength ion chambers, and the features described hereinabove whereby ion chamber 10 is provided with a non-uniform potential gradient between ion repeller electrode 30 and ion collector electrodes 40 are equally applicable to single ion chambers with a single ion collector electrode, or double ion chambers with dual ion collector electrodes.

I claim:

1. A device for detecting ionization of a gas by a source of radiant energy which provides a measurement of the absolute intensity of radiant energy comprising:

an evacuatable pressure chamber into which the gas can be introduced, means for introducing radiant energy into said chamber, an ion repeller electrode disposed within said chamber for repelling the ions and collecting the electrons formed by said ionization of said gas, at least one ion-collector electrode disposed within said chamber in spaced relation to said ion-repeller electrode for collecting the ions and repelling the electrons formed by said ionization of said gas, means for positively charging said ion-repeller electrode with respect to said at least one ion-collector electrode to create an electric field therebetween, and means for detecting the ions collected by said at least one ion collector electrode, said ion repeller electrode and said at least one ion collector electrode being constructed, configured and arranged with respect to each other such that said electric field has a non-uniform potential gradient between said ion repeller electrode and said at least one ion-collector electrode, allowing said gas to be ionized by said radiant energy in a region of comparatively low field strength, and the electrons thereby formed to be collected by said ion-repeller electrode with at most a small gain in energy to minimize secondary ionization of said gas by said electrons, while allowing said electrons to be repelled from said at least one ion collector electrode by a sufficiently high electron retarding potential to minimize the collection of said electrons by said at least one ion collector electrode.

2. The device of claim 1 wherein said ion-repeller electrode comprises a surface configured to define a substantially enclosed space of rectilinear transverse cross-section, said surface having axially extending edges in spaced, substantially opposed relationship to define an axial, relatively narrow, slot-like opening.

3. The device of claim 2 wherein said at least one ion collector electrode comprises a rod-like member of relatively small cross-section, said ion collector electrode being disposed parallel to and closely adjacent said slot-like opening of said ion-repeller electrode.

4. The device of claim 1 wherein said ion-repeller electrode comprises a surface curved to define a substantially enclosed space of curvilinear transverse cross-section, said surface having axially extending edges in spaced, substantially opposed relationship to define an axial, relatively narrow, slot-like opening.

5. The device of claim 4 wherein said at least one ion-collector electrode comprises a rod-like member of relatively small cross-section, said ion collector electrode being disposed parallel to and closely adjacent said slot-like opening of said ion-repeller electrode.

6. A device for detecting ionization of a gas by a source of radiant energy, comprising:

an evacuatable pressure chamber into which the gas can be introduced, means for introducing said radiant energy into said chamber, an ion-repeller electrode disposed within said pressure chamber for repelling the ions and collecting the electrons formed by ionization of the gas, said ion repeller electrode being substantially symmetrical about its transverse mid-plane, first and second ion collector electrodes for collecting the ions and repelling the electrons formed by ionization of the gas, said ion collector electrodes being disposed within said chamber in spaced relation to each other and in spaced relation to said ion repeller electrode such that said ion collector electrodes are substantially symmetrically disposed with respect to the transverse mid-plane of said ion repeller electrode, means for positively charging said ion-repeller electrode with respect to said ion collector electrodes to create an electric field therebetween, said electric field being symmetric about the transverse mid-plane of said ion repeller electrode, means for detecting the ions collected from said first ion collector electrode and from said second ion collector electrode, and means symmetrically disposed at spaced locations along said repeller electrode, relative to said transverse mid-plane, and maintained at the same potential as said repeller electrode for defining the axial ends of said electric field.

7. The device of claim 6 wherein said symmetrically disposed means comprise first and second end plates electrically connected to said ion repeller electrode and respectively disposed at each end thereof such that said end plates are substantially parallel with respect to each other and symmetrically disposed with respect to the transverse mid-plane of said ion repeller electrode.

8. The device of claim 7 wherein said end plates have therein a plurality of spaced holes.

9. The device of claim 7 wherein said end plates comprise substantially transparent mesh surfaces.

10. The device of claim 7 wherein the shape and arrangement of said ion repeller electrode and said ion collector electrodes with respect to each other is such that said electric field has a non-uniform potential gradient between said ion repeller electrode and said ion-collector electrodes, allowing said gas to be ionized by said radiant energy in a region of comparatively low field strength and the electrons thereby formed to be collected by said ion-repeller electrode with at most small gain in energy to minimize secondary ionization of said gas by said electrons, while allowing said electrons to be repelled from said at least one ion collector electrode by a sufficiently high electron retarding potential to minimize the collection of said electrons by said at least one ion collector electrode.

11. The device of claim 7 wherein said end plates are substantially identical.

* * * * *